Figure 1:
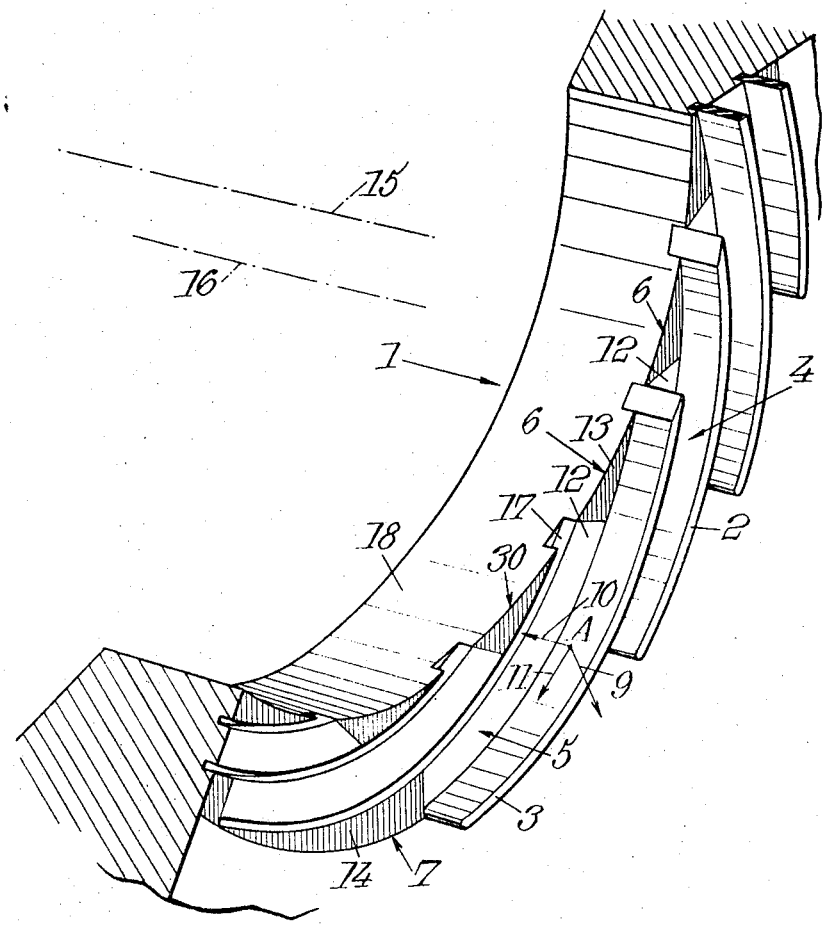

United States Patent [19]
Rioux et al.

[11] 3,854,065
[45] Dec. 10, 1974

[54] DEVICE FOR INCREASING THE PRESSURE OF A CONDUCTIVE LIQUID AND UNIPOLAR DYNAMO INCORPORATING SAID DEVICE

[75] Inventors: Christian Rioux, Cachan; Jean Lucidarme, Ste. Genevieve, both of France

[73] Assignee: Agence Nationale de Valorisation de la Recherche (Anvar), Neuilly-sur-Seine, France

[22] Filed: Apr. 2, 1973

[21] Appl. No.: 346,845

[30] Foreign Application Priority Data
Apr. 7, 1972   France .............................. 72.12259

[52] U.S. Cl. .................. 310/178, 310/11, 310/219, 417/50
[51] Int. Cl. .......................................... H02k 31/04
[58] Field of Search ......... 310/219, 178, 11; 417/50

[56] References Cited
UNITED STATES PATENTS

| | | |
|---|---|---|
| 2,716,943 | 9/1955 | Vandenberg .......................... 417/50 |
| 2,811,107 | 10/1957 | Brill ...................................... 417/50 |
| 2,982,214 | 5/1961 | Cochran et al. ....................... 417/50 |
| 2,988,000 | 6/1961 | Blake .................................... 417/50 |
| 2,990,485 | 6/1961 | Lee ....................................... 310/178 |
| 3,030,888 | 4/1962 | Keltz .................................... 417/50 |
| 3,143,673 | 8/1964 | Donaldson ...................... 310/178 X |
| 3,176,169 | 3/1965 | Neitzel ................................. 310/11 |
| 3,270,228 | 8/1966 | Rioux ................................... 310/178 |
| 3,546,508 | 12/1970 | Harvey ................................. 310/219 |

*Primary Examiner*—Donovan F. Duggan
*Attorney, Agent, or Firm*—Larson, Taylor & Hinds

[57] ABSTRACT

The device comprises a crown of electrically insulated elongated blades which define between themselves a channel for the passage of the liquid. Inlet means are provided for the conductive liquid, electrical current generating means for creating in each channel a current perpendicular to the surface defined by the longitudinal directions of the walls of the blades, and means for generating a magnetic field transverse to the said walls.

5 Claims, 2 Drawing Figures

DEVICE FOR INCREASING THE PRESSURE OF A CONDUCTIVE LIQUID AND UNIPOLAR DYNAMO INCORPORATING SAID DEVICE

The invention relates to a device for increasing the pressure of an electrically conductive liquid and more particularly to the application of this device to a unipolar dynamo adapted to generate an electrical current of very high intensity.

The unipolar dynamo mentioned above is of the type described in French patent No 1326439 filed March 19, 1962 and in its first certificate of addition No 83 144 filed March 1, 1963. This unipolar dynamo adapted to generate an electrical current of very high intensity comprises a solid rotor which comprises a mass of high inertia and a conductive mass of revolution, a stator comprising a conductive mass arranged so as to present two surfaces of revolution each facing a corresponding surface of the conductive mass of revolution of the rotor, each surface being separated from the facing surface by an air gap, said conductive mass of the stator being at least partly laminated and means for the injection of a conductive liquid into the air gaps. This dynamo is preferably used in combination with means enabling the rotor to be gradually driven to high speed.

It is an object of the invention to enable the production of a device of the type concerned which does not comprise a movable part, which is of the electromagnetic type and of which the manufacture is particularly simple.

The device according to the invention is characterised by the fact that it comprises in combination a crown of elongated and curved blades, which blades are each, electrically insulated and define between adjacent blades a channel or space for the passage of said liquid between a first end and a second end opposite the first in the direction of the length of the blades, inlet means for introducing the conductive liquid at the first end of each space separating said insulated blades, electrical current generating means adapted to create in each of said spaces, when the conductive liquid is in these spaces, a current of direction substantially perpendicular to the surface defined by the longitudinal directions of the walls of the blades which bound the abovesaid interval, and magnetic field generator means, this magnetic field having, in each of the abovesaid spaces, a direction transverse with respect to the abovesaid walls of the blades which define this space so that the magnetic field and said electrical current create in each space, a Laplace force of direction substantially tangential to the walls of the blades which define it, this force being oriented from the first to the second end.

Preferably, the blades of said crown are arranged so that two neighboring blades, bounding between themselves a channel, are derived from one another by rotation through a given angle around a given axis, each blade having a shape of a wall of a cylinder of which the axis is parallel to the above-said given axis and distinct from the latter, current generator means being adapted to create an electrical current of which the current lines are, in the spaces separating the blades, parallel to said given axis and the magnetic field generating means being arranged so that this magnetic field is, in the abovesaid spaces, of a direction substantially radial with respect to said given axis.

Advantageously, at the level of said spaces or channels, said crown is bounded by walls of directions substantially perpendicular to said given axis, at least one of these walls comprising, in the end parts of the spaces, insulating layers.

According to another aspect, the invention relates to a dynamo of the above-mentioned type, characterised by the fact that the injection means comprise an electromagnetic device for increasing the pressure of said conductive liquid, this electromagnetic pressure-increasing device forming an integral part of the stator of said unipolar dynamo and being arranged so that it is actuated, on one hand, by the magnetic field of the dynamo, and on the other hand, by the electrical current which passes through the latter.

Figure 2:
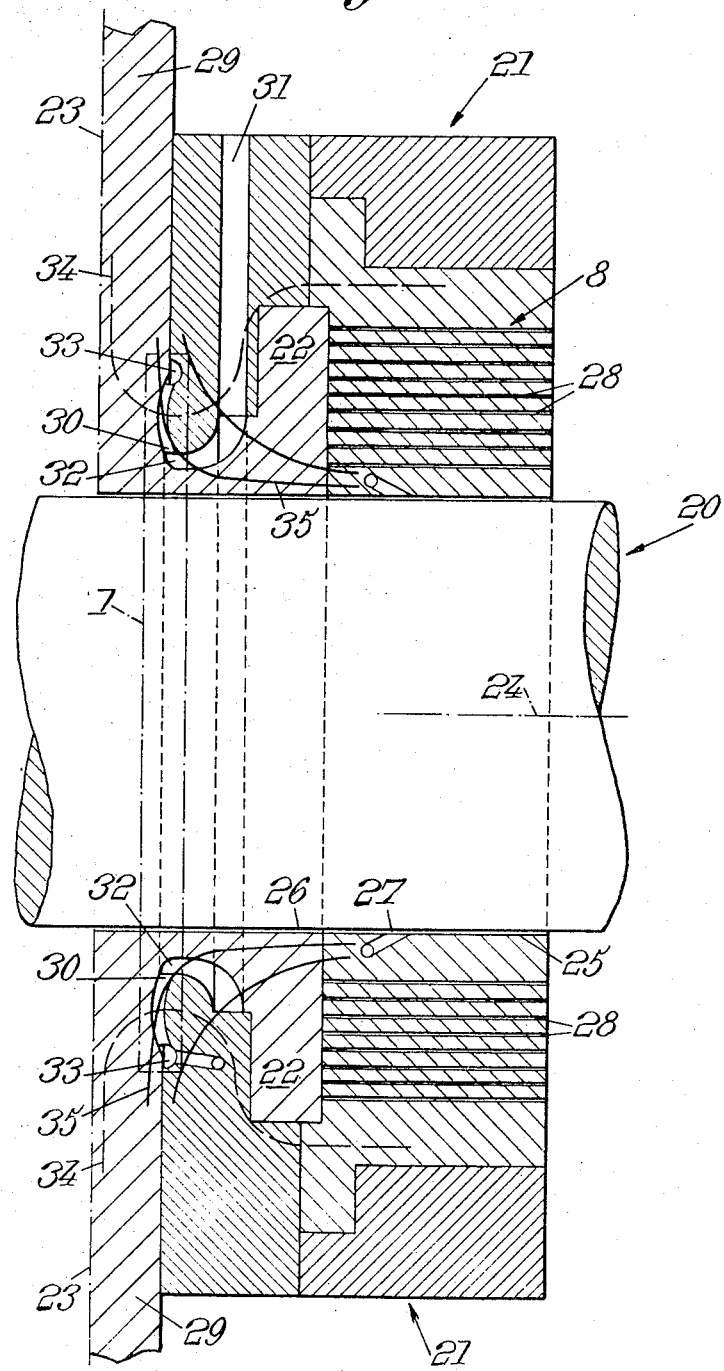

Other features, characteristics and advantages of the invention will appear also in the course of the description of the preferred embodiment of the invention which follows, in combination with the drawings in which:

FIG. 1 is a partial view in perspective illustrating the crown of blades of the device according to the invention, and FIG. 2 shows, in diagrammatic manner, a half section of a unipolar dynamo of the above-mentioned type, through a plane passing through the axis of rotation of the rotor and comprising the pressure-increasing device according to the invention.

According to the invention and more particularly, according to that of its types of application as well as according to those embodiments of its various parts to which it would appear that preference should be given, in order to produce a pressure-increasing device for an electrically conducting liquid such as mercury, procedure is as follows or in analogous manner.

This device, which can also be denoted as "an electromagnetic pump", shown in FIGS. 1 and 2, comprises firstly a crown 1 of blades comprising electrically insulated elongated blades 2, 3 . . . . These blades are distributed around an axis so that they define spaces or channels 4, 5 . . . between two neighboring blades 2, 3 . . . , these spaces being open at two opposite ends, respectively 6 and 7. The end 6 is closer to the abovesaid axis than the corresponding end 7. The crown 1 is arranged so that mercury can penetrate into the spaces through the ends 6. The pressure-increasing device according to the invention comprises, lastly, on one hand, means for generating electrical currents (not shown in FIG. 1) which create, when the mercury is in each space 4, 5 . . . , currents whose lines have, in the spaces, a direction substantially parallel to the transverse direction of the walls of the blades 2, 3; in other words, these currents have a direction substantially perpendicular to the longitudinal direction defined by each wall between the ends 6 and 7. The abovesaid device comprises, on the other hand, generating means 8 (FIG. 2) for a magnetic field which create, in each of the abovesaid spaces, such as the space 4, a magnetic field whose direction is transverse with respect to the walls of the blades 2 and 3.

There is shown in FIG. 1, at a point A of this space 5, the magnetic field by an arrow 9 having the direction and the sense of this magnetic field at the point A, and the electrical current passing through the mercury contained in the space 5 by an arrow 10 having also the direction and the sense of this current at the point A. The arrow 11 represents the direction and the sense of the force which, according to the law of Laplace, results from the action of the magnetic field denoted by the arrow 9 on the electrical current denoted by the arrow 10. The direction of this force is both perpendicular to the direction of the magnetic field and to that of the electrical current. It is seen in FIG. 1, that this force has, in the space 5, a direction substantially tangential to the longitudinal direction of the walls of the corresponding blades and a sense which is that which starts from the end 6 to arrive at the end 7 of the space 4.

The mercury which is thus introduced through the end 6 at a given pressure, for example of the order of 100 bars, emerges through the ends 7 at a pressure substantially greater by reason of the Laplace force to which it is subjected when it traverses the spaces or channels.

Of course, the spaces or channels are closed at their longitudinal periphery in order to form closed passages through which the mercury must pass.

The walls of the blades 2 and 3 which are inside the space 4 for example, are completed by complementary walls on each side of the length of these blades; thus it is seen in FIG. 1 that the wall 12 completes on one side the space or channel 4, the other wall not having been shown in this Figure. It is necessary that these complementary walls should be conductive at least over a portion of their surface in order that the electrical current, symbolized by the arrow 10, may pass transversely through the mercury flowing in these channels. Preferably, these complementary walls are insulated in the neighborhood of the ends 6 and 7 so that the lines of the current passing transversely through the mercury in the channels can have a direction which does not depart too much from the direction perpendicular to the general direction of each channel. To this end, these complementary walls are covered in the vicinity of the ends, with insulating material: thus the wall 12 is covered in the neighborhood of the end 6 of the space 5, with an insulating layer 13 and this wall 12 is covered, in the vicinity of the end 7, with an insulating layer 14. These insulating layers could occur on one and/or the other of the complementary walls.

In the advantageous embodiment shown, each blade is deduced from its neighbor, by rotation through a given angle around an axis 15. Each blade has the shape of a segment of a cylindrical wall whose axis 16 (for the blade 2, for example) is parallel to the axis 15 but distinct from the latter. The distance between the axes 15 and 16 must however be reduced in order that the direction of each of the blades approaches as much as possible the tangential direction with respect to a circle centered on the axis 15. In this embodiment, the blades are formed of an insulating material and are installed, along one of their long edges, inslots 17 of substantially rectangular cross-section, of a metallic part 18 having the shape of a cylindrical crown. The other long edge of these blades can also be housed in slots of another metallic part (not shown). The current generating means are connected to contacts (not shown) on each of the metallic parts.

The device which has just been described is applied, in very advantageous manner, to a dynamo adapted to generate electrical currents of very high intensities of the type described in the abovesaid French patent No 1 326 439 and in its first certificate of addition.

This unipolar dynamo, which is shown diagrammatically in FIG. 2, includes, in the first place, a solid rotor 20 which comprises a mass of high inertia and a conductive mass of revolution (that which is shown in FIG. 2). This dynamo comprises, in the second place, a stator 21 comprising a conductive mass 22 which is arranged so as to have two surfaces of revolution each facing a corresponding face of the conductive mass of revolution of the rotor 20. In the embodiment shown, this stator comprises a plane of symmetry 23 perpendicular to the axis 24 of revolution of the rotor and there is shown diagrammatically only the portion of the dynamo which occurs on a given side of this plane 23; one of the two faces of revolution of the stator, facing a corresponding surface of the conductive mass of revolution of the rotor, is the face 25, the other face being symmetrical with the latter with respect to the said plane 23. The face of the rotor which is opposite the face 25 is the surface of revolution 26. These facing surfaces 25 and 26 are separated by a space 27 called "an air gap". The conductive mass of the stator 21 is partly laminated, that is to say that, on a portion of this stator conductive zones are separated by insulating layers 28. This lamination enables the generation of a magnetic field capable of exerting a non-zero torque on the rotor when it is traversed by a current and renders the dynamo self-energising. The rotor of this dynamo is driven gradually to high speed and means, not shown, are provided to inject a conductive liquid into all the air gaps at the same time so as to connect in series the conductive masses of the stator and of the rotor. When a conductive liquid is injected into all the air gaps, the kinetic energy stored due to the fact of rotation of the rotor is transformed into an electrical current pulse of very high amplitude flowing in the circuit constituted by the whole of the conductive masses of the rotor and of the stator and by, if necessary, an external circuit element connected to the stator 21 through the radial parts 29 of the latter.

In the aforesaid patent, it is indicated that the pressure of injection of the conductive liquid must be greater than the sum of the magnetic and centrifugal pressures exerted on the injected liquid. Now experiments have shown that, in order to obtain a satisfactory operation of the dynamo, it is also necessary that the pressure of the conductive liquid injected into the air gaps be greater than a critical pressure, this critical pressure being proportional to the square of the intensity of the current which passes through the dynamo when the conductive liquid is injected into the latter.

The pressure-increasing device or electromagnetic pump which has been described above with respect to FIG. 1, is installed in the mass of the stator. It enables the injection of the conductive liquid into the air gaps at a pressure greater than the abovesaid critical pressure, this pressure varying substantially as the square of the intensity of the current which passes through the dynamo.

In the abovesaid embodiment of the dynamo shown in FIG. 2, the pressure-increasing device, produced by construction within the mass of the stator, is of the type of the preferred embodiment of the device described above and illustrated (in part) in FIG. 1. The axis of this device is the axis 24 of the rotor. The conductive liquid which is preferably mercury, as previously indicated, is brought to the inner annular periphery 30 of the circular crown 1 of blades by means of a passage 31 through a trough 32 or gutter having a shape of revolution around the axis 24. The mercury which is introduced into the crown 1 through the passage 31 and the gutter 32, hence arrives at the end 6 of the spaces separating the blades. The mercury emerges from this device through the end 7 and is removed through a second trough or gutter 33 which has also a shape of revolution around the axis 24. A set of passages formed in the mass of the stator enables the mercury, arriving in the gutters 33, to arrive at the air gaps 27.

The current generating and magnetic field generating means forming part of the pressure-increasing device for the mercury are, respectively, the dynamo itself and the laminated masses of the stator of this dynamo. The path of the current has been shown, in FIG. 1, by the line 34 in interrupted lines and it is seen that this line 34 passes indeed transversely through the abovesaid spaces. In the same way, the direction of the magnetic field created by the laminated mass has been shown by solid lines 35. The magnetic field has indeed, at the level of the crown of blades, a direction substantially radial with respect to the axis 24.

Simple calculation shows that the increasing pressure between the gutter 32 and the gutter 33 is indeed proportional to the square of the current density which passes through the dynamo. In fact, the Laplace law shows that this increase in pressure $\Delta p$ satisfies the formula:

$$\Delta p = \int B \, i \, dl$$

in which formula:

B represents the value of the magnetic field in the channels of the crown of blades, $i$ the density of the current (proportional to the intensity I) in these channels.

If it is assumed that these quantities B and $i$ are constant over the length of a channel, there is obtained:

$\Delta p = B \, i \, l$ where $l$ represents the length of a channel. The magnetic field B being substantially proportional to the intensity of the current $i$, it is seen that this increase in pressure $\Delta p$ is indeed substantially proportional to the square $I^2$ of the current in the dynamo.

In one embodiment of the abovesaid dynamo, the mercury is injected into the passage 31 by a primary injection system (not shown), this mercury arriving in the crown 1, passing through the air gaps, then being recirculated into the primary injection system. In the course of experiments carried out within the scope of the invention, there was produced a dynamo enabling the obtaining of pulses of 100 megajoules and, in this dynamo, the primary injection system used enabled the injection of mercury at a pressure of 110 bars and, at the outlet from the pressure-increasing device, the said pressure was 310 bars.

As is self-evident and as emerges already from the foregoing, the invention is in no way limited to that of its types of application, nor to those embodiments of its various parts, which have been more especially indicated; it encompasses on the contrary, all modifications.

We claim:

1. Device for increasing the pressure of an electrically conducting liquid, comprising, in combination, a crown of elongated and curved blades which are each electrically insulated and adjacent blades of which crown define between themselves a space for the passage of said liquid between a first end and a second end opposite the first in the direction of the length of the blades, inlet means for bringing the conductive liquid to the first end of each said space, electric current generating means adapted to create in each said space, when the conductive liquid is within said space, an electric current of high intensity and of direction substantially perpendicular to the surface defined by the longitudinal directions of the walls of the blades which define said space, and magnetic field generating means for generating a magnetic field having, at each space, a direction transverse with respect to said walls of the blades which define said space, so that said magnetic field and said electric current create in each space a Laplace force of substantially tangential direction to the walls of the blades which define that space, said force being oriented from said first towards said second end, said electric current generating means being independent of the said conductive liquid.

2. Device according to claim 1, wherein the blades of the crown are arranged so that two neighboring blades, defining a channel between themselves, are developed from one another by rotation through a given angle about a given axis, each blade having the shape of a wall of a cylinder whose axis is parallel to and distinct from said given axis, the current generating means being adapted to create an electric current whose current lines are, in the spaces separating the blades, parallel to said given axis and said magnetic field generating means being arranged so that said magnetic field is, in said spaces, of direction a substantially radial with respect to said given axis.

3. Device according to claim 2, wherein at the level of said spaces, the crown is defined by walls of directions substantially perpendicular to said given axis, at least one of said walls comprising insulating layers in the end parts of the spaces.

4. A unipolar dynamo for generating an electrical current of very high intensity, said dynamo comprising a solid rotor which has a mass of high inertia and a conductive mass of revolution, a stator comprising a conductive mass arranged so as to present two surfaces of revolution each facing a corresponding face of the conductive mass of revolution of the rotor, each said surface being separated from the corresponding face by an air gap, said conductive mass of the stator being at least partly laminated, and means for the injection of a conductive liquid between the air gaps, said injection means comprising an electromagnetic device for increasing the pressure of said conductive liquid, said electromagnetic pressure-increasing device forming an integral part of the stator of said unipolar dynamo and being arranged so that electromagnetic device is actuated, on one hand, by the magnetic field of the dynamo and, on the other hand, by the electrical current which passes through the latter, said electromagnetic device being situated in a region of the stator where the current which passes through the dynamo, when the conductive liquid is injected in said air gaps, is substantially perpendicular to the magnetic field in said stator.

5. Dynamo according to claim 4, wherein the pressure-increasing device of the conductive liquid has the shape of a crown of blades, each blade of said crown being electrically insulated, said crown comprising an axis which coincides with the axis of rotation of the rotor, each blade having the shape of a part of the wall of a cylinder whose axis is parallel to the axis of the rotor, two neighboring blades being developed from one another by rotation through a given angle around the axis of the rotor, said blades being arranged in a region of the stator where the current which passes through the dynamo when the conductive liquid is injected, is parallel to the axis of the rotor and where the magnetic field is radial.

* * * * *